Patented Apr. 7, 1925.

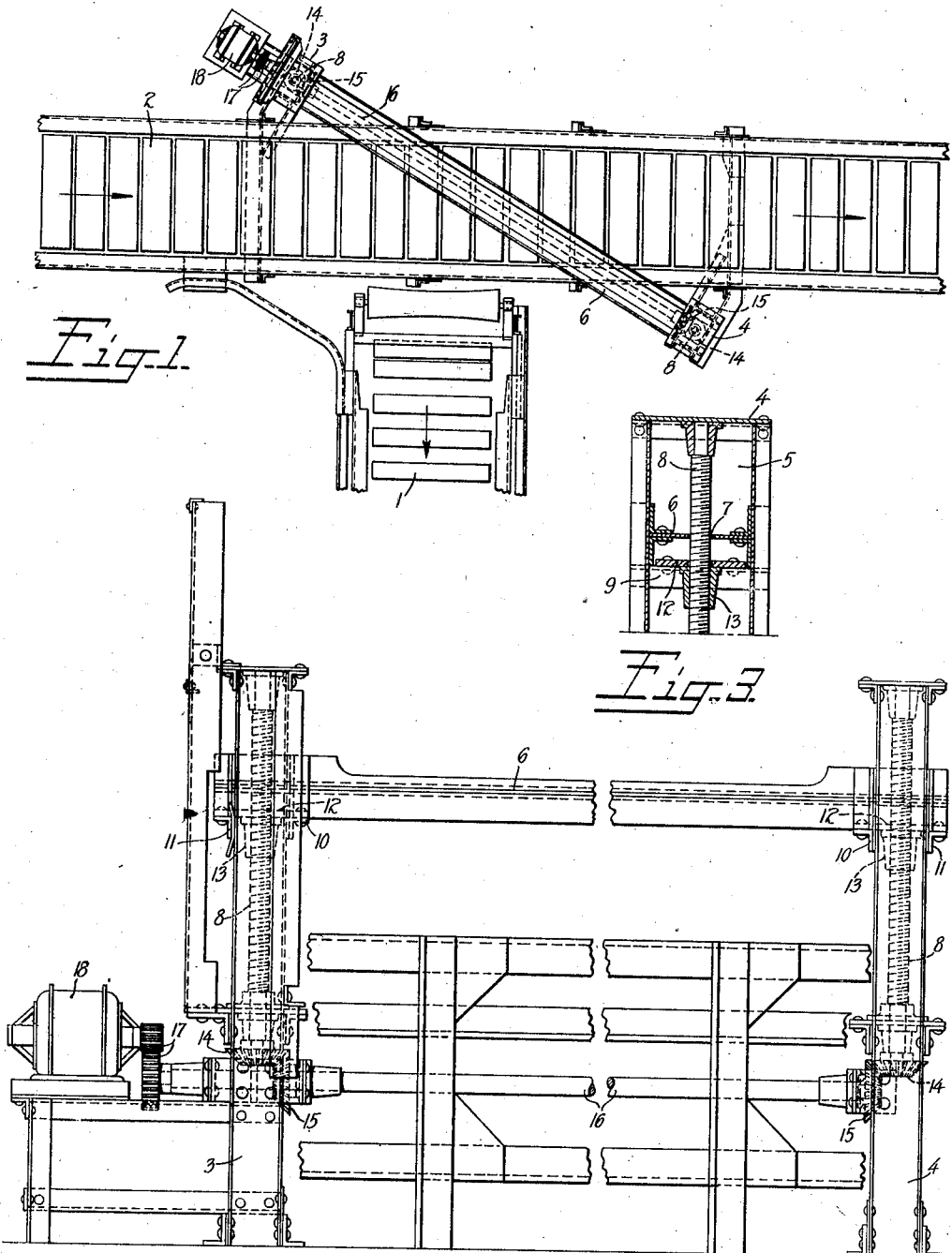

1,532,228

UNITED STATES PATENT OFFICE.

FREDERICK S. CARPENTER, OF HARTFORD, CONNECTICUT, ASSIGNOR TO THE HARTFORD RUBBER WORKS COMPANY, OF HARTFORD, CONNECTICUT, A CORPORATION OF CONNECTICUT.

DEFLECTING DEVICE FOR CONVEYER SYSTEMS.

Application filed May 29, 1923. Serial No. 642,172.

*To all whom it may concern:*

Be it known that I, FREDERICK S. CARPENTER, a citizen of the United States, residing at Hartford, county of Hartford, and State of Connecticut, have invented a certain new and useful Deflecting Device for Conveyer Systems, of which the following is a full, clear, and exact description.

This invention relates to conveyer systems and, more particularly, to a device for directing articles from a main run to or past a branch run, as may be desired.

While the invention relates to conveyer systems in general, it is particularly intended for press-room conveyers in tire factories of the general type illustrated in United States Patent to H. J. Hoyt No. 1,452,836, granted April 24th, 1923, and especially for directing the molds from a main run to or past a branch run contiguous to the main run. An object of the invention is to provide a simple, reliable and practical device for accomplishing this purpose and other objects will appear in the following detailed description.

An embodiment of the invention is illustrated in the accompanying drawings in which:

Figure 1 is a plan view of a portion of the conveyer system with the deflector appearing inclined to the main run;

Figure 2 is an illustration of the mechanism as it would appear looking along the branch run; and Figure 3 is a detail illustrating a separable connection between the deflector or beam and a driving lead screw for lifting the ends of the beam.

In connection with conveyer systems having one or more branch runs, such as that indicated at 1, arranged transversely and in proximity to a main run, such as that indicated at 2, it is often desirable to deflect the articles from the main run to the branch run, for instance when there is no more available space on the conveyer system beyond one of the branch runs. The present invention provides a device for allowing articles, such as molds, being transported to or past a branch run at will, the form of invention illustrated in the drawings being particularly adapted for tire vulcanizing molds in a press-room where vulcanization is carried on.

As shown in the drawings, guides 3 and 4 are located on opposite sides of the main run and contiguous the junction thereof with a branch run. The guides 3 and 4 may be variously constructed of any suitable materials, as shown being made of structural plates and angles suitably riveted together, an opening or slot 5 being provided for the reception of the ends of a beam 6. The beam 6 may be of any suitable shape and cross-section, but, preferably, has a broad face for engaging and deflecting the molds or other articles.

The web portion of the beam 6 is apertured, as indicated at 7, at each of its ends, to loosely pass threaded shafts 8, rotatably supported in, but endwise immovable, relation to the guides or housings 3 and 4. Supporting each end of the beam 6, is a head, indicated generally by the numeral 9, comprising angles 10 and 11, which engage opposite sides of the guides 3 and 4, these angles 10 and 11 in turn being secured (riveted) to a cap-plate 12, which passes through the guide-slot 5 in the direction of extent of the beam 6. Secured to the plate 12 in any suitable manner, as by pins or bolts (not shown), so as to prevent rotation thereof, is a nut 13, which is thereby controlled to move up or down when the corresponding threaded shaft 8 is rotated.

The lower ends of the threaded shafts 8 are each provided with a bevelled gear 14, intermeshed with another, 15, fast to a shaft 16, which may be driven in any suitable manner, as by the gears 17 and motor 18.

Operation of the device: Assuming molds or other articles are being transported on the main run 2, in the direction of the arrow, the supervisor of the press room will observe when it is necessary to raise or lower the beam 6 and pass the molds or other articles beyond the branch conveyer 1 or onto the same. By pressing a button (not shown) suitably wired to the motor control, he may operate the motor to raise or lower the beam. If the beam 6 in descending happens to drop upon the mold or article, the separable connection between the beam 6 and the head-plates 12 will permit the beam to rest upon the article which scrapes along beneath the beam until clear thereof, whereupon, the beam 6 falls upon the head-plates and continues to descend therewith. Automatic stop means may be provided, if desired, to limit the opposite extremes of movement of the beam 6, a variety of suitable devices being well-known and available for this purpose.

It is to be understood that various changes may be made in the details of the construction without departing from the underlying principles of this invention, and therefore reference should be made to the appended claims for an understanding of its scope.

Having thus described my invention, what I claim and desire to protect by Letters Patent is:—

1. The combination with a conveyer system having a main run and a branch run arranged transversely and in proximity to the main run, of means adjacent the junction of the main and branch runs for governing the movement of articles on the main run to or past the branch run, comprising, a beam arranged at an inclination to the main run, means for maintaining the beam at said inclination but permitting bodily movement thereof from an article-obstructing position adjacent the main run to a non-obstructing position removed from the main run, and means for shifting the beam to and from an article-obstructing position including a lost motion connection allowing the beam to temporarily rest upon an article on the main run until it has been carried past and clear of the beam.

2. The combination with a conveyer system having a main run and a branch run extending transversely from the main run, of means adjacent the junction of the main and branch runs for governing the movement of articles on the main run to or past the branch run, comprising, a beam, upright guides for the ends of the beam arranged to maintain it inclined to the main run, a means for shifting said beam relative to its guides including, a threaded device, a nut, means for preventing rotation of the nut, and a separable connection intermediate the nut and said beam.

3. The combination with a conveyer system having a main run and a branch run, of means adjacent the junction of the main and branch runs for governing the movement of articles on the main run to or past the branch run, comprising a beam, slotted housings for guiding the opposite ends of said beam, lead screws rotatably supported by said housings, a motor, connections intermediate said motor and lead screws for rotating the latter, a threaded device cooperating with each of said lead screws, and a separable connection between said threaded device and the opposite ends of said beam.

4. The combination with a conveyer system having a main run and a branch run, of means adjacent the junction of the main and branch runs for guiding articles on the main run to or past the branch run, comprising, a beam, guides for the ends of the beam arranged to maintain it inclined to the main run, threaded shafts parallel to said guides, a nut on each of said threaded shafts, means secured to said nut for preventing its rotation, said last-named means disengageably supporting the opposite ends of said beam, and means for rotating said threaded shafts in unison and uniformly whereby to raise or lower the opposite ends of the beam at the same rate.

Signed at Hartford, county of Hartford, and State of Connecticut, this 26 day of May, 1923.

FREDERICK S. CARPENTER.